(12) United States Patent
Shoji

(10) Patent No.: US 6,332,521 B1
(45) Date of Patent: Dec. 25, 2001

(54) STARTING CLUTCH

(75) Inventor: Masao Shoji, Kakegawa (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/518,685

(22) Filed: Mar. 3, 2000

(30) Foreign Application Priority Data

| Mar. 10, 1999 | (JP) | 11-063377 |
| Apr. 20, 1999 | (JP) | 11-112196 |
| Aug. 24, 1999 | (JP) | 11-236909 |

(51) Int. Cl.[7] .................................................. F16D 23/00
(52) U.S. Cl. ...................... 192/55.61; 192/70.17; 192/85 AA
(58) Field of Search ............... 192/55.61, 70.17, 192/85 AA, 91 A, 109 A, 109 F

(56) References Cited

U.S. PATENT DOCUMENTS

| 3,285,379 | * | 11/1966 | Helquist | 192/85 AA |
| 4,623,055 | * | 11/1986 | Ohkubo | 192/85 AA |
| 4,706,789 | * | 11/1987 | McColl et al. | 192/85 AA |
| 4,775,041 | * | 10/1988 | Boffelli | 192/70.27 |
| 5,090,539 | * | 2/1992 | Wolf et al. | 192/85 AA |
| 5,813,508 | * | 9/1998 | Shoji et al. | 192/55.61 X |

FOREIGN PATENT DOCUMENTS 9-303421 (A) * 11/1997 (JP).

* cited by examiner

Primary Examiner—Richard M. Lorence
(74) Attorney, Agent, or Firm—Miles & Stockbridge P.C.

(57) ABSTRACT

In a starting clutch having input side elements and output side elements that are frictionally engaged with each other by receiving an axial load, urging means for permanently urging such elements is provided. Further, in a starting clutch comprising a multi-plate clutch having a hub, a damper device and a housing for covering the multi-plate clutch and the damper device, an outer peripheral side of the hub of the multi-plate clutch is connected to drive side elements.

17 Claims, 6 Drawing Sheets

STARTING CLUTCH

BACKGROUND OF THE INVENTION

1. Field of the Invention

The present invention relates to a starting clutch which can be used in place of a torque converter in a motor vehicle or the like.

2. Related Background Art

Conventionally, in automatic transmissions (ATs), starting of a vehicle has been effected by torque transmission using a torque converter. Since the torque converter has a torque increasing effect and provides smooth torque transmission in increasing and decreasing torque, the torque converter has been incorporated into various vehicles having an automatic transmission.

On the other hand, the torque converter has a disadvantage because it has a great slip amount in increasing and decreasing torque and therefore is not efficient.

Thus, recently, it has been proposed to use a starting clutch in place of the torque converter, and it has been contemplated that torque is amplified by reducing a gear ratio and increasing the number of speed changes.

FIG. 4 is an axial sectional view of a conventional starting clutch. A conventional technique will be described with reference to FIG. 4. A starting clutch 100 includes a multi-plate clutch 101. Within a clutch case 106 of the multi-plate clutch 101, friction plates 102 which are output side friction engaging elements, and separator plates 103 which are input side friction engaging elements are alternately arranged. Further, a backing plate 104 is provided at one end in an axial direction. The backing plate 104 is supported by a stop ring 105 at an axial outer side (left in FIG. 4). On the other hand, at an end opposed to the backing plate 104, there is disposed a piston 108 arranged within the clutch case 106 with an O-ring 107 there between. The piston 108 is biased toward the right by a return spring 116 so that the separator plates 103 and the friction plates 102 are normally brought to a non-engaged condition. Further, an oil chamber 109 is defined between the piston 108 and the clutch case 106.

The starting clutch 100 comprises the multi-plate clutch 101, a housing 110 covering outer periphery of the multi-plate clutch 101, and a damper 117 disposed between the clutch case 106 and the housing 110. The housing 110 is connected to an output shaft 111 of an engine, and the damper 117 is constituted by a spring 130, a retainer plate 113 for holding the spring 130 and a pawl portion 114 for fitting into the spring 130.

In the starting clutch 100, when oil pressure is supplied to the oil chamber 109 through an oil passage 115, the piston 108 is operated to achieve a friction engaging condition.

In the above-mentioned starting clutch 100, a predetermined clearance is provided for the non-engaged or released condition, and, since the clearance is maintained by the biasing force of the return spring against the piston, the torque is completely interrupted.

FIG. 6 is an axial sectional view of a conventional starting clutch (upper half). The starting clutch 50 is includes a damper device 27 and a multi-plate clutch device 11 and is divided into drive side elements and driven side elements. The drive side elements include a connecting portion 21 to an output shaft of an engine, the damper device 27, a housing 20 covering the entire apparatus, a clutch case 16 of the multi-plate clutch 11, and separator plates 13, a backing plate 14, a piston 18 and a base ring 37 which are attached to the clutch case 16. The driven side elements include an output shaft 32, a hub 31 of the multi-plate clutch 11, friction plates 12 and a joint ring 38. The friction plates 12 and the joint ring 38 are attached to a cylindrical portion of the hub 31. The cylindrical portion of the hub 31 and the joint ring 38 are interconnected via a bottom surface 39 extending radially inwardly.

More particularly, the damper device 27 comprises a spring 30, a retainer plate 24 secured to an inner wall of the housing 20 by caulking and adapted to hold the spring 30, and a fitting pawl 23 attached to outer periphery of the clutch case 16. O-rings 17 are disposed between the piston 18 and an inner wall of the clutch case 16 and between the piston 18 and an outer peripheral surface of the base ring 37. There is provided a return spring 26 for biasing the piston 18 toward a releasing direction for the multi-plate clutch (right in FIG. 6), and a member for attaching the return spring 26 is provided on the base ring 37.

The piston 18 is operated by generating oil pressure in an oil chamber 19 by supplying oil through an oil passage 22. Further, a snap ring 15 for supporting the friction plates 12, separator plates 13 and backing plate 14 is arranged an end of an opening of the clutch case 16, and a seal bearing 36 is disposed between the joint ring 38 and the base ring 37. Further, resin washers 40 are disposed between the housing 20 and the hub 31 and between the hub 31 and the base ring 37 and between the clutch case 16 and an oil pump plunger 41.

However, in the conventional technique shown in FIG. 4, since there is the clearance, upon starting the vehicle, when an acceleration pedal is depressed, there arises a timelag (time difference) until the starting clutch is tightened, thereby creating idle charging and shock upon tightening.

To eliminate this, various control methods have been proposed to obtain smooth starting or running of a vehicle by achieving smooth tightening of the clutch upon starting. However, such control is very difficult due to dispersion in number of revolutions of the engine.

Further, in the conventional clutch shown in FIG. 6, problems regarding compactness and weight-reduction of the clutch, which have been investigated in recent technical developments cannot be solved. The present invention provides a starting clutch in which an axial dimension can be reduced, the number of parts can be reduced and the entire construction can be simplified compared to conventional starting clutches.

SUMMARY OF THE INVENTION

Accordingly, an object of the present invention is to provide a starting clutch in which smooth tightening can be achieved with a simple mechanism, thereby permitting smooth running of a vehicle.

Another object of the present invention is to provide a starting clutch in which a connecting portion between a main body of the apparatus and an output shaft can be simplified, an axial dimension can be reduced compared to conventional clutches, and correct centering can be achieved.

To achieve the above object, the present invention provides a starting clutch having input side elements and output side elements that are frictionally engaged with each other by receiving an axial load from an urging means for permanently urging elements.

Further, a starting clutch is provided according to the present invention, having a multi-plate clutch with a hub, a damper device and a housing for covering the multi-plate clutch and the damper device, wherein an outer peripheral side of the hub of the multi-plate clutch is connected to drive side elements, thereby solving the above problems.

The invention also provides a starting clutch having a wet type multi-plate clutch that is used as a clutch with input side elements and output side elements that are frictionally engaged with each other. Further, an urging spring for biasing a piston toward a direction opposite to an acting direction of a return spring is disposed in the oil chamber.

Further, a sliding condition of the input side elements and the output side elements can be maintained by hydraulic control instead of the spring.

The invention also provides a starting clutch in which smooth tightening and smooth running can be achieved.

Further provided is a starting clutch in which response of operation due to the oil pressure of the piston can be hastened, an axial dimension of the entire apparatus can be reduced compared to conventional apparatus, and smooth tightening and smooth running can be achieved with a simple construction.

In addition, the invention eliminates excessive sliding movement of the friction engaging elements and excessive load acting on the engine by interrupting creep torque upon the stoppage of the vehicle.

The present invention provides a starting clutch wherein the outer periphery of the hub constituting the multi-plate clutch is connected to the drive side elements, the one surface of the hub is connected to the drive side elements via the damper device, and the inner periphery of the hub is supported by the drive side element portions.

The hub is an annular member having a laid U-shaped cross-section, the friction plates are arranged on splines formed on outer periphery of an inner cylindrical portion of the hub, the damper device is fitted onto the outer periphery of an outer cylindrical portion, and the outer periphery of the damper device is fitted into the housing. With this arrangement, an attachment structure at an inner diameter side of the hub is simplified. Further, since the attaching of the outer periphery of the hub was conventionally effected at an outer peripheral side of the clutch case, the present construction is not as complicated.

The inner periphery of the hub is supported by a tip end portion of the oil pump shaft. Since the oil pump shaft is disposed out of the apparatus as is the housing, a bottom surface extending toward the inner diameter side of the hub is not required, with the result that the axial dimension of the apparatus is not required for reserving the attachment space.

The damper device is disposed between the cylindrical portion of the outer peripheral side of the hub and the housing. The damper device has a greater radial dimension so that it is disposed on the outer periphery of the multi-plate clutch, with the result that a spring of the damper device can be lengthened compared to conventional devices, thereby damping vibration efficiently.

DESCRIPTION OF THE PREFERRED EMBODIMENT

Figure 1:
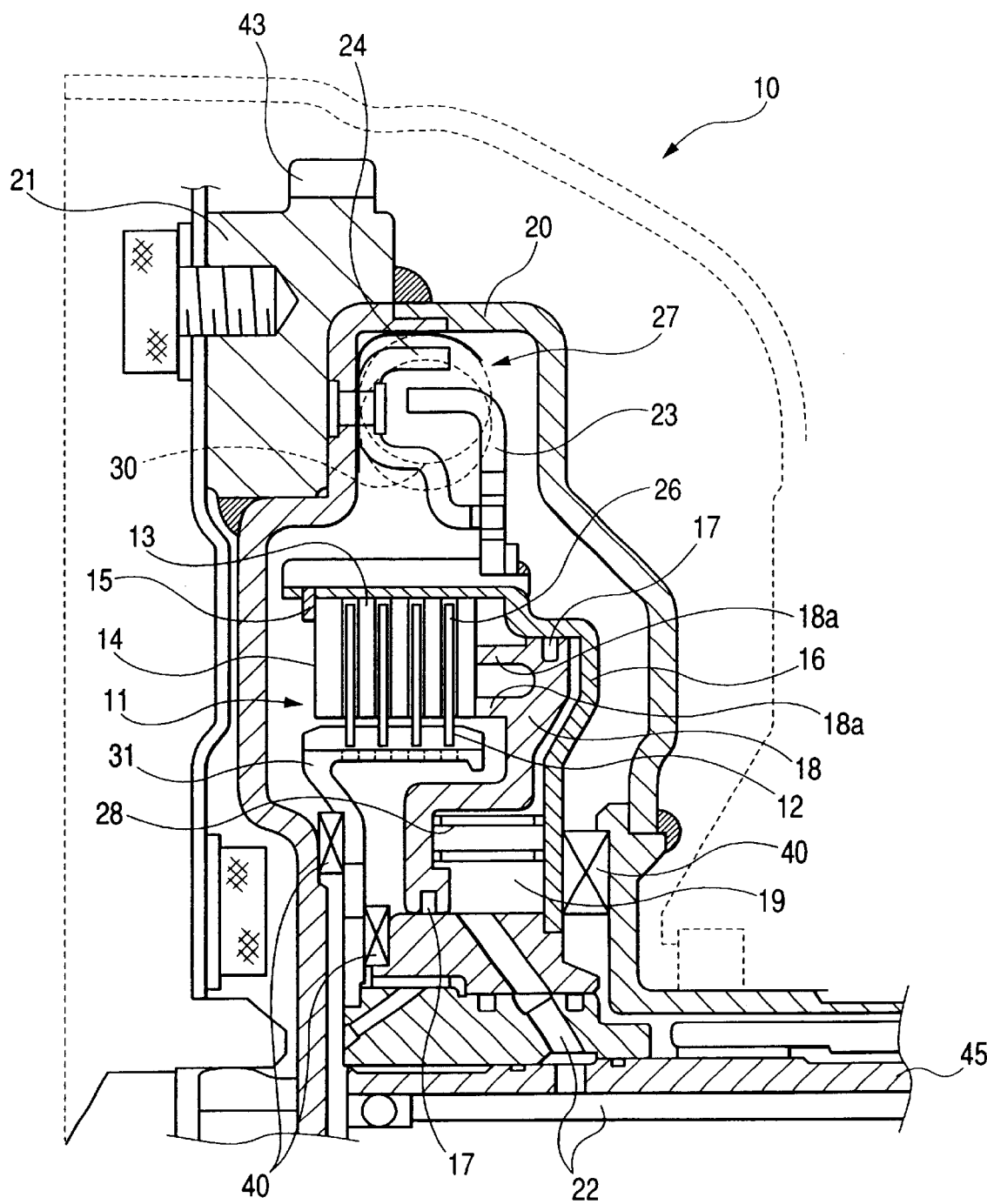
FIG. 1 is an axial sectional view of a starting clutch according to a first embodiment of the present invention.

The present invention will now be explained in connection with embodiments thereof with reference to the accompanying drawings. Explanation of the same elements and function as those of the above-mentioned conventional examples will be omitted. Incidentally, in the drawings, the same elements are designated by the same reference numerals.

First Embodiment

FIG. 1 is an axial sectional view of a starting clutch according to a first embodiment of the present invention. A starting clutch 10 includes a multi-plate clutch 11. Within a clutch case 16 of the multi-plate clutch 11 are substantially annular friction plates 12, which are output side friction engaging elements and substantially annular separator plates 13, which are input side friction engaging elements. The friction plates 12 and the separator plates 13 are arranged alternately. A substantially annular backing plate 14 is fixedly supported by a substantially annular stop ring 15 at an axial end of the clutch case 16.

Although the multi-plate clutch 11 is constituted by four friction plates 12 and four separator plates 13, it should be noted that the number of the friction engaging elements can be changed appropriately in accordance with a required torque. Further, substantially annular friction members 26 or a plurality of segmented friction members 26 arranged in a circular pattern are secured to both axial surfaces of each friction plate 12 by bonding or the like. Of course, such a friction member may be secured to only one surface of each friction plate in accordance with the required torque.

On the other hand, in FIG. 1, at an axial right side of the friction engaging elements, there is disposed a piston 18 arranged within the clutch case 16 with an O-ring 17 there between, and an oil chamber 19 is defined between the piston 18 and the clutch case 16. Within the oil chamber 19, there is disposed an urging spring 28 for urging the friction engaging elements toward the left (FIG. 1) so that the friction engaging elements are brought to an engaged or tightened condition.

The starting clutch 10 comprises the multi-plate clutch 11, a housing 20 covering outer periphery of the multi-plate clutch 11, and a damper 27 disposed between the clutch case 16 and the housing 20. The housing 20 is connected to a driven plate 21 fixed to an output shaft of an engine, and splines 43 for fitting in a starter motor are provided on the outer periphery of the driven plate 21. Further, the damper 27 is constituted by a retainer plate 24 holding a spring 30 and attached to an inner wall of the housing 20, and a pawl portion 23 attached to the outer periphery of the clutch case 16 and fitted in the spring 30.

In the starting clutch 10, when oil pressure is supplied to the oil chamber 19 through an oil passage 22 from a hydraulic circuit (not shown), the piston 18 is operated. The piston 18 is shifted to the left (FIG. 1) in the axial direction. As the piston is shifted, urging pieces 18a of the piston 18 abut against the outermost separator plate 13, and, as the piston is further shifted, between the outermost separator plate 13 and the backing plate 14, the friction plates 12 and the separator plates 13 are frictionally engaged with each other by the axial urging force generated by the piston 18. A cavity is formed between the urging pieces 18a so that the weight of the piston 18 is reduced, thereby improving the response of the piston 18. Incidentally, Seiter washers (resin bearings) 40 are disposed between the housing 20 and the clutch case 16 and between the housing 20 and a hub 31.

In the first embodiment having the above-mentioned arrangement, even in a condition where the oil pressure from the oil passage 22 is interrupted, by an urging force of the spring 28 set appropriately, a weak engaging condition between the separator plates 13 and the friction plates 12 can be maintained (slip engaging condition), thereby generating predetermined creep torque, which cannot be attained by conventional techniques.

Figure 2:
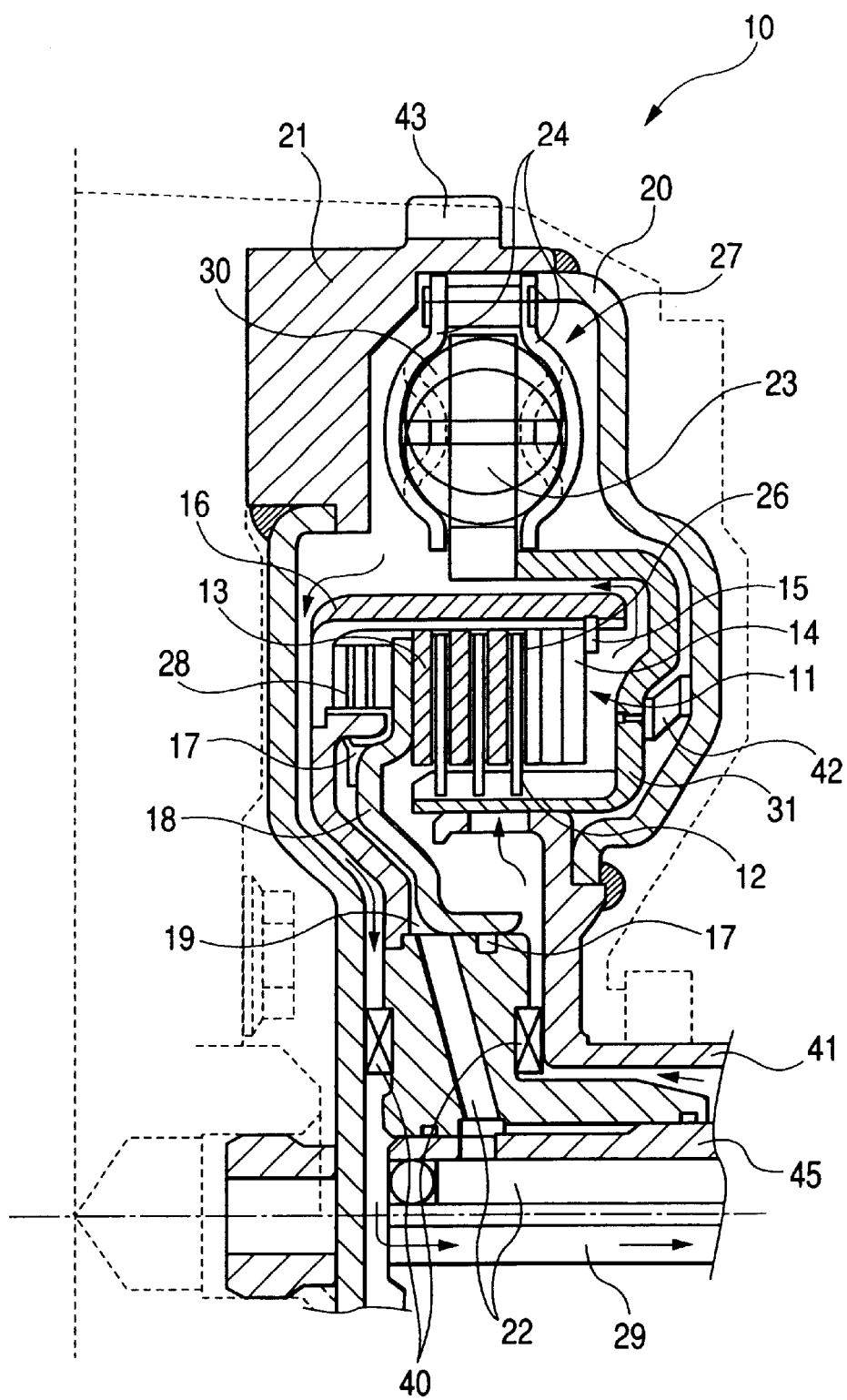
FIG. 2 is an axial sectional view of a starting clutch according to a second embodiment of the present invention.

FIG. 2 is an axial sectional view of a starting clutch according to a second embodiment of the present invention. Since the fundamental construction is the same as that of the first embodiment, only the differences with respect to the first embodiment will be explained. The clutch case 16 is attached to an output side, and the hub 31 is attached to an input side from the engine (not shown). Further, the damper 27 is attached to the hub 31. That is to say, the engine, hub 31 and damper 27 are rotated synchronously.

In this embodiment, the spring 28 is a biasing member disposed outside of the oil chamber 19 rather than the inside of the oil chamber as in the first embodiment. The spring 28 is disposed between the piston 18 and the clutch case 16. Accordingly, the spring 28 is located in a space corresponding to the axial dimension of the oil chamber 19. Further, by configuring the piston 18 to extend along the inner wall of the clutch case 16, a volume of the oil chamber 19 is reduced. Further, the housing 20 is provided with a slide surface 41, which is in sliding contact with the hub 31 within an operating range of the damper 27. A Seiter washer 42 is disposed between the hub 31 and the housing 20. Further, arrows in FIG. 2 indicate flow of lubricating oil for lubricating the multi-plate clutch.

Figure 3:
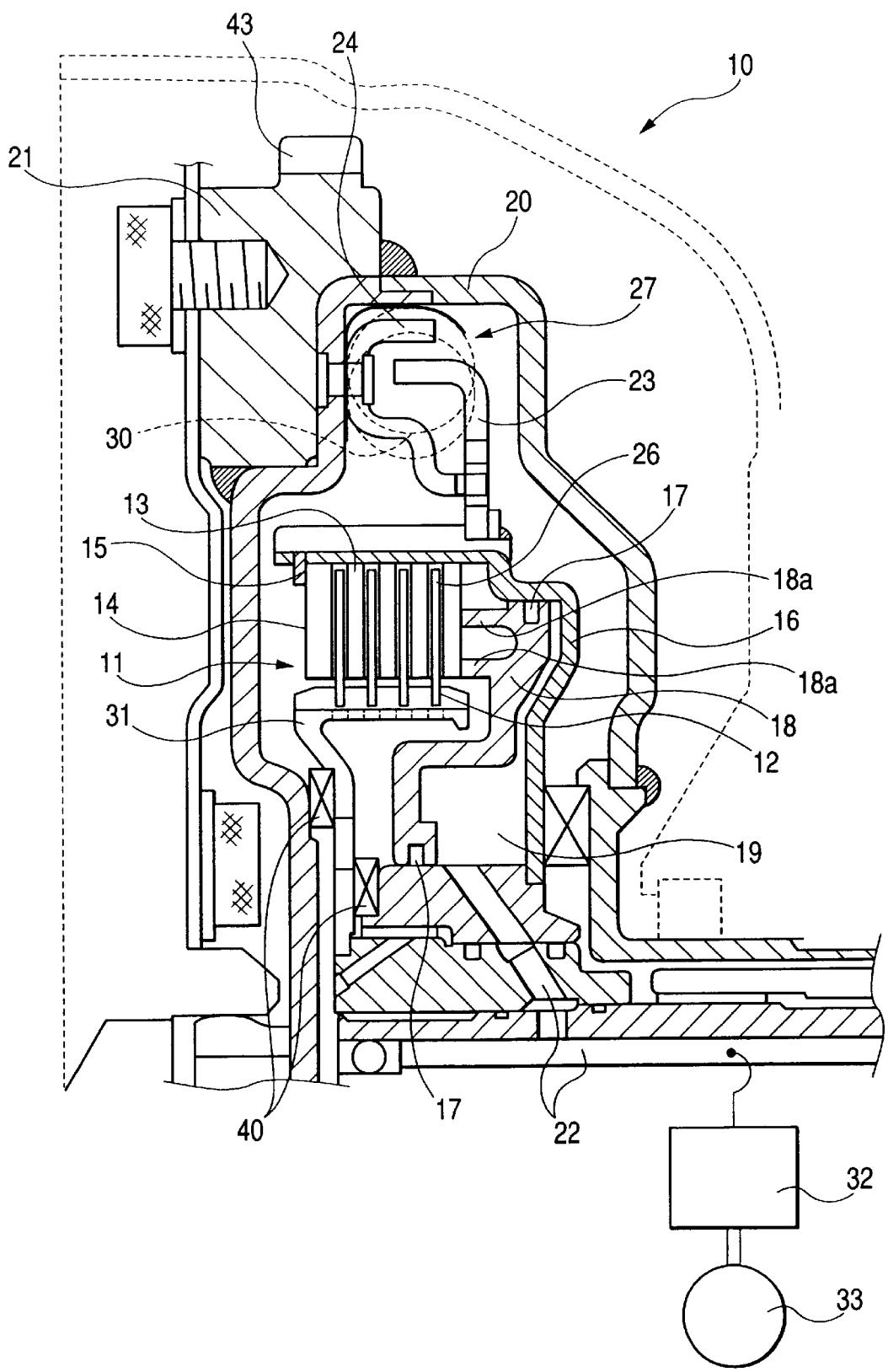
FIG. 3 is an axial sectional view of a starting clutch according to a third embodiment of the present invention.
Figure 4:
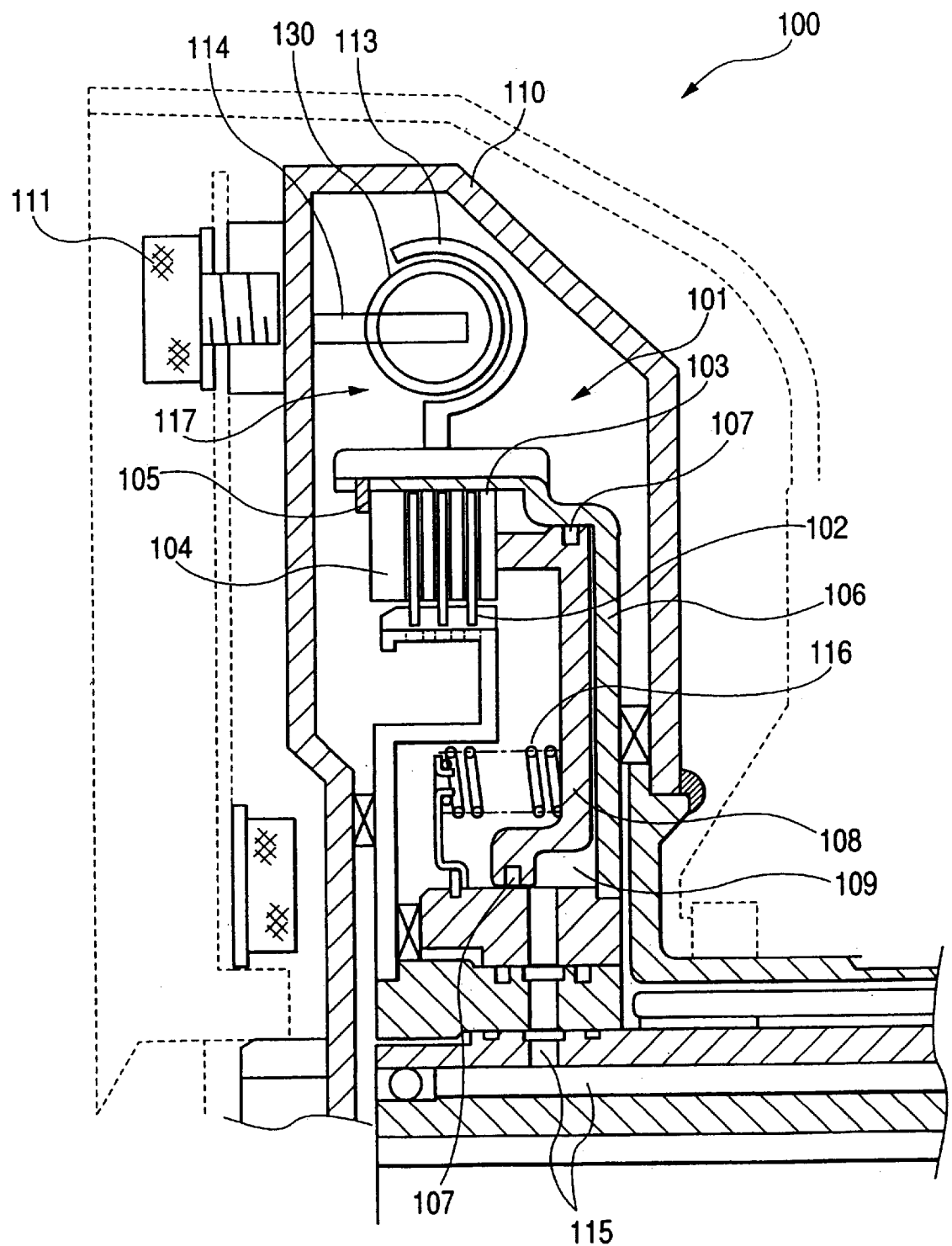
FIG. 4 is an axial sectional view of a conventional starting clutch.

FIG. 3 is an axial sectional view of a starting clutch according to a third embodiment of the present invention. Since the fundamental construction is substantially the same as that of the first embodiment, the same elements as those in the first embodiment are designated by the same reference numerals and only the differences with respect to the first embodiment will be explained.

In the third embodiment, a spring is not used. Creep torque is created by oil pressure generated by an electric pump 33 and a hydraulic circuit 32 including known electromagnetic valves and an oil pump in communication with the oil passage 22, which is connected to the oil chamber 19. In the third embodiment, the starting clutch 10 does not have a spring for urging the piston, and, the urging force for creep is controlled by the oil pressure. That is to say, the engagement between the friction engaging elements is not OFF completely, so that an engaged condition due to sliding rotation is maintained.

In the above-mentioned first to third embodiments, when the vehicle is stopped by decreasing the oil pressure, the sliding rotation between the friction plates (output side friction engaging elements) 12, and the separator plates 13 and the backing plate 14 (input side friction engaging elements), creep torque is created. When the vehicle is started or is running, the friction engaging elements are tightened by increasing the oil pressure, thereby effecting torque transmission.

It is difficult to generate a predetermined oil pressure in a pump having an engine as a drive source, because of the change in the number of revolutions of the engine. However, by using an electric pump 33 having an electric motor (not shown) as a drive source in addition to the engine, a predetermined oil pressure can easily be supplied. A known hydraulic circuit having an electric pump can be used, such as the circuit disclosed in U.S. Pat. No. 5,845,756 (Japanese Patent Laid-open No. 9-151963) according to the Applicant of the subject application.

Now, a relationship between the starting clutch according to the present invention and a transmission (such as an automatic transmission) will be described.

The following Table 1 shows a result of comparison between the tightened condition, sliding condition and released condition of the starting clutch (SC) and a first stage clutch (FC) of the transmission under the control of oil pressure:

TABLE 1

|  | SC | FC |
| --- | --- | --- |
| Neutral | ○ | x |
| Stop 1 | ○ | x |
| Stop 2 | ● | ○ |
| Start (flat road) | ●→○ | ○ |
| Start (ascent) | ●→○ | ○ |
| Running | ○ | ○ |
| Deceleration 1 | ○→● | ○ |
| Deceleration 2 | ○ | x |

(○: tightened condition, ●: sliding condition, x: released condition)

Both in the starting clutch SC and the first stage clutch FC, the oil pressure is ON during the tightened condition. The sliding condition of the starting clutch SC may be adjusted by load torque. Accordingly, during the sliding condition, the oil pressure to the starting clutch SC is considered as all of cases: ON, OFF, ON→OFF and OFF→ON. That is to say, as shown in the Table 1, in the stop 2, start (flat and ascent) and deceleration 1, the sliding rotation condition can be established.

Further, depending upon the load torque, the starting clutch SC may assume the tightened condition or the sliding condition. For example, in a condition that the oil pressure is OFF, when the idling running is effected, the sliding condition may be established on the ascent road and the tightened condition may be established on the descent road.

The present invention can be used to obtain the neutral condition by interrupting the power transmission between the starting clutch and the output. For example, by releasing either one of the clutches in the transmission, the neutral condition can be obtained. Normally, the neutral condition is obtained by releasing the first stage clutch FC and tightening the starting clutch.

By using the starting clutch in this way, the sliding rotation of the starting clutch upon stopping the vehicle can be eliminated, thereby preventing loss of excessive energy. As a result, for example, the load acting on the engine can be reduced, thereby reducing the wear of the friction engaging elements of the starting clutch.

Further, upon starting, with the starting clutch in the sliding condition, the power transmission from the starting clutch to the output can be effected. For example, the first stage clutch FC of the transmission is tightened, and, from a condition that the tightening oil pressure for the starting clutch is OFF, i.e., from the sliding condition in which only the urging force is exerted by the spring and the like, by gradually increasing the oil pressure to achieve the tightened condition, the vehicle can be started. By doing so, the tightening operation of the starting clutch can be effected smoothly and the vehicle can be started smoothly.

In the above-mentioned embodiments of the present invention, the starting clutch in which the input side elements and the output side elements are frictionally engaged with each other by receiving the axial load corresponds to a wet type or dry type multi-plate clutch, single plate clutch or cone clutch, for example. Further, for example, a leaf spring, a coil spring or a wave spring can be used as the spring for the urging means. Incidentally, the urging means for generating the creep torque are referred to means for generating an urging force by which the input side elements and the output side elements are slidingly rotated, and, for example, means for generating an urging force to the extent that, in a condition that the engine is being rotated in a stopped vehicle, the engine is not stopped by the sliding rotation. In a condition that the creep torque is generated, when the transmission is changed to a D-range and then the brake pedal is released, the vehicle starts slowly. Incidentally, the urging force of the urging means, i.e., spring force and oil pressure, may be set in consideration of the weight of the vehicle and the coefficient of friction and friction engaging areas of the friction engaging elements of the starting clutch.

Figure 5:
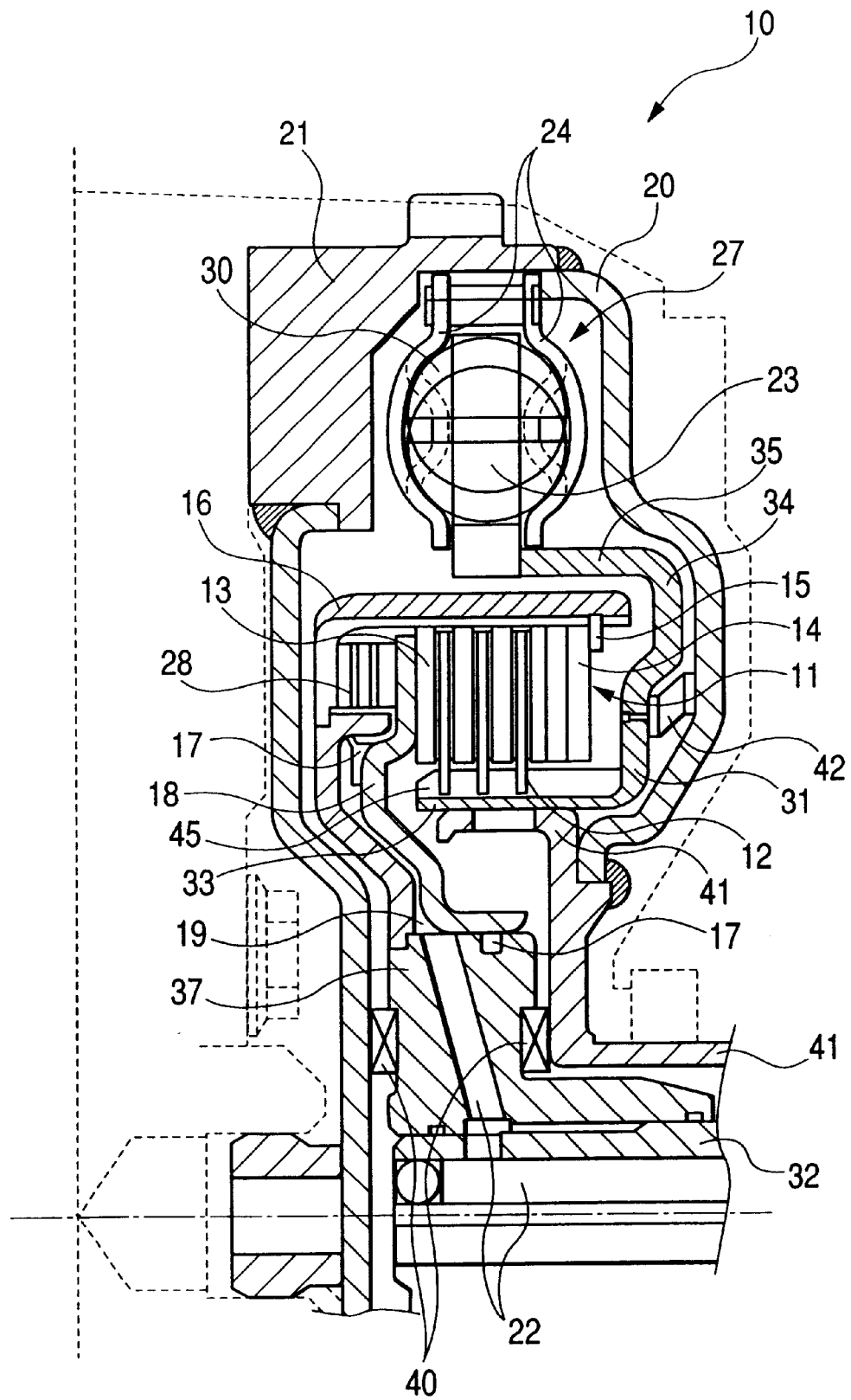
FIG. 5 is an axial sectional view of a starting clutch according to a fourth embodiment of the present invention (upper half)

FIG. 5 is an axial sectional view of a starting clutch according to a fourth embodiment of the present invention (upper half). A hub 31 has a laid U-shaped cross section and comprises an outer cylindrical portion 35, an inner cylindrical portion 33, and a bottom surface portion 34 integrally connecting the outer cylindrical portion 35 and the inner cylindrical portion 33.

Splines 45 extending axially are formed on a radial outer peripheral surface of the inner cylindrical portion 33 of the hub 31, and the friction plates 12 are fitted on the splines 45.

A resin washer 42 is secured to the bottom surface portion 34, so that the bottom surface portion 34 is supported in an axial direction by the washer 42 disposed between the inner wall of the housing 20 and the bottom surface portion 34.

The outer cylindrical portion 35 extends toward the outer diameter side of the clutch case 16, and the fitting pawl 23 of the damper device 27 is fitted in the tip end of this cylindrical portion. Accordingly, the outer cylindrical portion 35 is connected to the housing 20 (part of the drive side elements) via the damper device 27.

Figure 6:
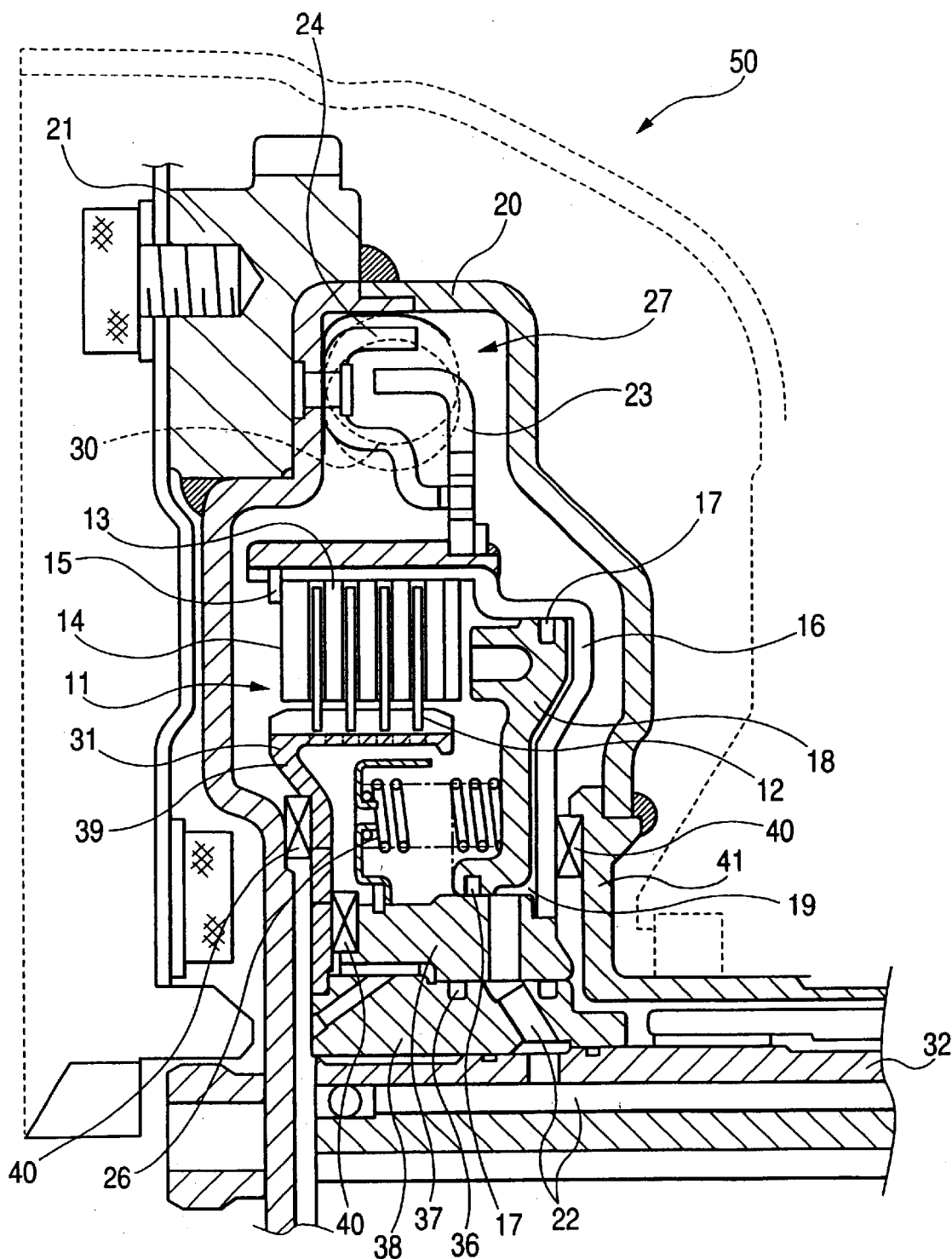
FIG. 6 is an axial sectional view of a conventional starting clutch (upper half).

With this arrangement, the joint ring 38 and the seal bearing 36 in the conventional example shown in FIG. 6 can be omitted. Further, since the hub 31 is attached to the housing 20 via the damper device 27, the bottom surface 39 extending radially inwardly in the conventional example shown in FIG. 6 can be omitted. That is to say, similar to the housing 20, since the oil pump shaft 41 is disposed out of the apparatus, the bottom surface extending radially inwardly of the hub 31 is not required. Accordingly, it is not required that the axial dimension of the apparatus be increased to reserve the attachment space. Further, the inner periphery of the inner cylindrical portion 33 of the hub 31 is supported by a tip end portion of the oil pump shaft 41. With this arrangement, correct centering can be achieved.

For the same reason as the conventional device, resin washers are disposed between the housing 20 and the base ring 37 (relative rotation) and between the base ring 37 and the oil pump shaft 41 (relative rotation).

Since the damper device 27 is disposed between the outer cylindrical portion 35 and the housing 20, the damper device can have a greater radial dimension so that it is disposed on the outer periphery of the multi-plate clutch, with the result that the spring can be lengthened, thereby damping vibration efficiently.

In the fourth embodiment shown in FIG. 5, the return spring for biasing the multi-plate clutch 11 toward the left to release the engagement condition between the friction plates 12 and the separator plates 13 as in the conventional clutch, showing FIG. 6, is not provided. In place of the return spring, an urging spring 28 for generating an urging force to the extent that it permanently biases the multi-plate clutch toward the tightened condition to generate the creep torque is arranged on the outer periphery of the oil chamber 19.

The starting clutch of the present invention mentioned above has the following advantages.

A starting clutch capable of achieving smooth tightening and smooth vehicle starting can be provided.

Further, response of the operation of the piston to the oil pressure can be hastened, the axial dimension of the entire apparatus can be reduced, and a starting clutch capable of achieving smooth tightening and smooth vehicle starting can be provided with a simple construction.

Further, by interrupting the creep torque when the vehicle is stopped, excessive sliding of the friction engaging elements and excessive load acting on the engine can be eliminated.

In addition, the connecting portion between the apparatus and the output shaft can be simplified and the axial dimension can be reduced. Lastly, correct centering of the apparatus can be achieved.

What is claimed is:

1. A starting clutch in which input side elements and output side elements are frictionally engaged with each other by receiving an axial load, comprising:

urging means for permanently urging such elements to generate creep torque.

2. A starting clutch according to claim 1, wherein said urging means is a biasing member which is disposed outside of an oil chamber for generating the axial load.

3. A starting clutch according to claim 2, wherein said biasing member is disposed at an outer periphery side of said oil chamber.

4. A starting clutch according to claim 1, wherein said urging means includes a spring.

5. A starting clutch according to claim 2, wherein said biasing member includes a spring.

6. A starting clutch according to claim 3, wherein said biasing member includes a spring.

7. A starting clutch according to claim 1, wherein said urging means include an electric pump, so that said elements are permanently urged by oil pressure supplied from said electric pump.

8. A method for using a starting clutch in which input side elements and output side elements are frictionally engaged with each other by receiving an axial load, wherein:

in a neutral condition of a vehicle, power transmission from said starting clutch to an output position is interrupted and said starting clutch is tightened.

9. A method for using a starting clutch in which input side elements and output side elements are frictionally engaged with each other by receiving an axial load, wherein:

said starting clutch is shifted from a sliding condition wherein said input side elements and said output side elements are weakly engaged under a predetermined axial load to a tightened condition by increasing the axial load acting on said elements, thereby starting a vehicle.

10. A starting clutch comprising a multi-plate clutch having a hub and drive side elements including a damper device and a housing covering said multi-plate clutch and said damper device, wherein:

an outer peripheral side of said hub of said multi-plate clutch is connected to at least one of said drive side elements when said multi-plate clutch is in a non-tightened condition.

11. A starting clutch according to claim 10, wherein said hub is connected to at least one of said drive side elements via said damper device.

12. A starting clutch according to claim 11, wherein an inner periphery of said hub is supported by a part of said drive side elements.

13. A starting clutch having input side elements and output side elements frictionally engaged with each other by receiving an axial load, comprising:

an urging device constructed and disposed to urge the input side elements and the output side elements together to generate creep torque.

14. A starting clutch as recited in claim 13, wherein the urging device is a spring.

15. A starting clutch as recited in claim 13, wherein the urging device is a piston.

16. A starting clutch as recited in claim 13, wherein the urging device is disposed outside of an oil chamber for applying the axial load.

17. A starting clutch comprising:

an input side element and an output side element, and having a tightened state in which the input side element and the output side element are tightly frictionally engaged with each other to transmit torque and a released state in which the input side and output side elements are released from the tightened state, and further comprising an urging device operative to urge the input side and the output side elements into weak frictional engagement with each other to generate creep torque in the released state.

* * * * *